May 20, 1930.  I. GOTTLIEB ET AL  1,758,942
MACHINE FOR FORMING FISH CAKES AND THE LIKE
Filed Aug. 8, 1927   3 Sheets-Sheet 1
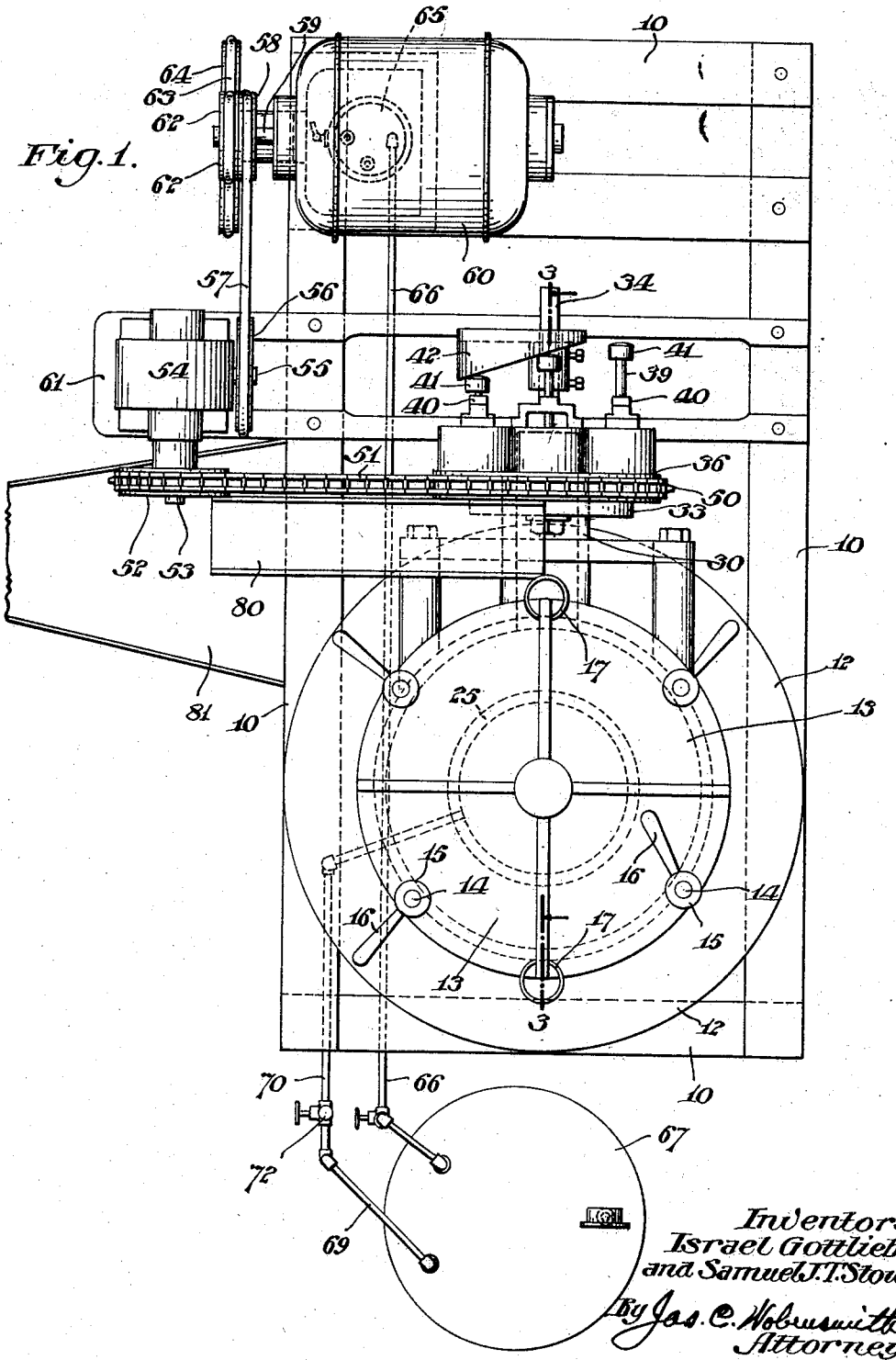
Inventors
Israel Gottlieb,
and Samuel J. T. Stord,
By Jas. C. Wobusmith
Attorney

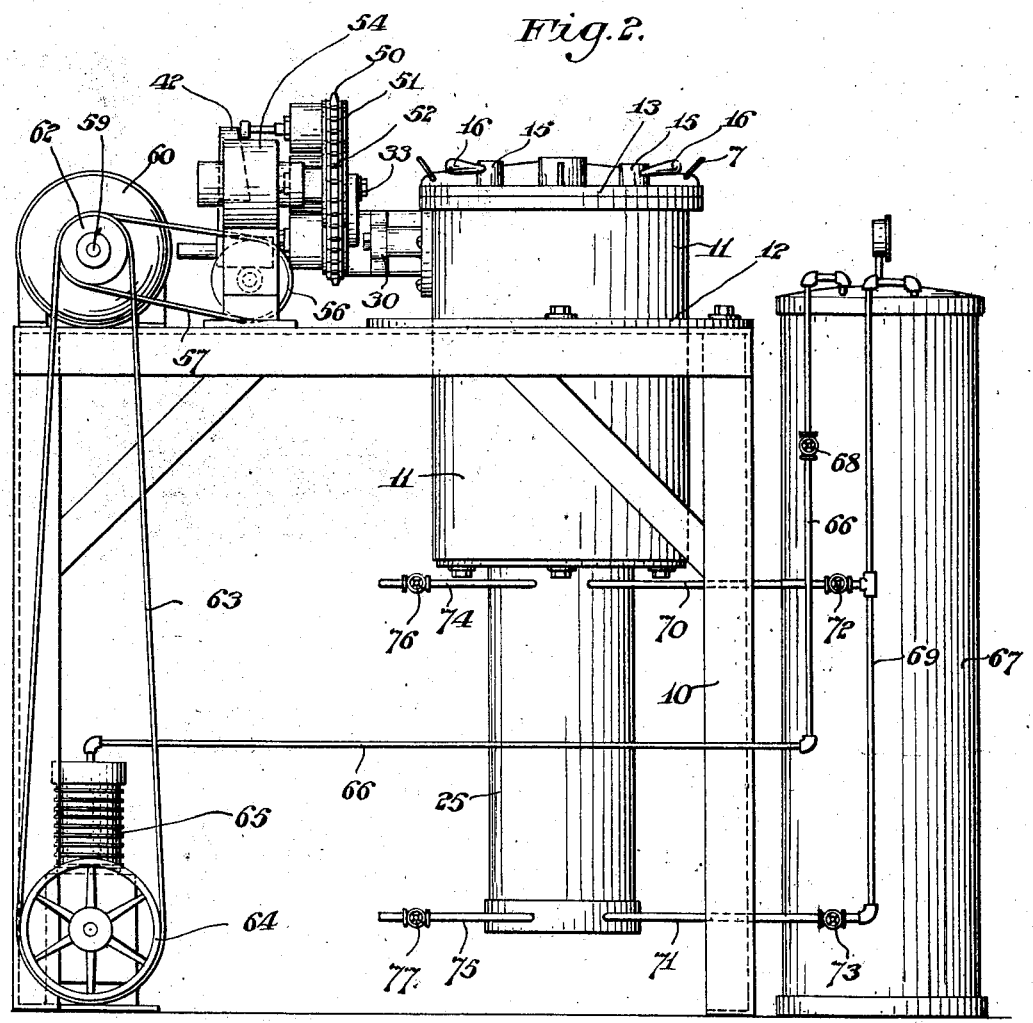
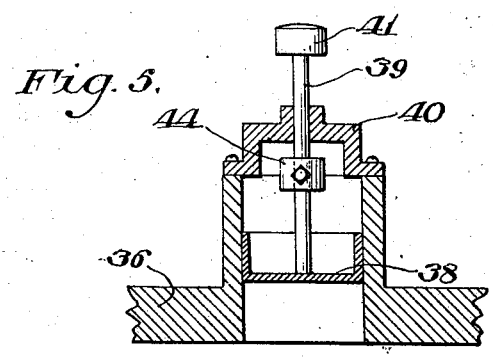

May 20, 1930.  I. GOTTLIEB ET AL  1,758,942
MACHINE FOR FORMING FISH CAKES AND THE LIKE
Filed Aug. 8, 1927   3 Sheets-Sheet 3
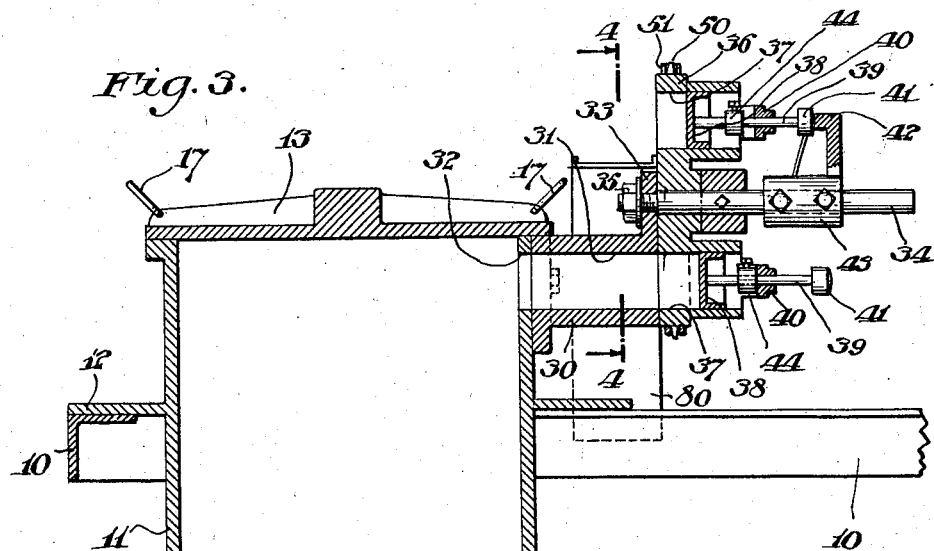

Patented May 20, 1930

1,758,942

UNITED STATES PATENT OFFICE

ISRAEL GOTTLIEB AND SAMUEL J. T. STOUT, OF PHILADELPHIA, PENNSYLVANIA

MACHINE FOR FORMING FISH CAKES AND THE LIKE

Application filed August 8, 1927. Serial No. 211,414.

Our invention relates to a machine for forming fish cakes and the like, that is to say, to apparatus for forming, from a mass of material of the proper admixture, a plurality of uniformly shaped and sized cakes which may be subsequently cooked or otherwise treated to produce the finished article.

The principal objects of our invention are to provide a machine for rapidly and economically forming fish cakes and the like of a uniform size and shape; and to provide in such a machine a rapidly moving mold member, means for filling the molds of said member, means for ejecting the formed cakes from the mold member, and means for varying the size of the molds whereby cakes of varying sizes may be produced in the same machine.

The nature and characteristic features of our invention will be more readily understood from the following description, taken in connection with the accompanying drawings forming part hereof, in which:

Figure 1 is a top or plan view of a machine embodying the main features of our present invention;

Fig. 2 is a side elevation thereof, somewhat reduced in scale, certain parts being omitted;

Fig. 3 is a fragmentary central sectional view taken approximately on the line 3—3 of Fig. 1;

Fig. 4 is a section taken approximately on the line 4—4 of Fig. 3; and

Fig. 5 is an enlarged section of the mold member taken approximately on the line 5—5 of Fig. 4.

Referring to the drawings, in the particular embodiment of our invention therein shown, 10 is the frame of the machine, which may be made of structural shapes or in any other preferred manner. The frame 10 supports a cylindrical receptacle 11, which is provided with a flange 12 for attachment to the frame 10. The receptacle 11 is adapted to receive the mass of material from which the cakes are formed.

The top of the receptacle 11 is closed by means of a head plate 13, the same being preferably maintained in place by means of bolts 14, nuts 15 provided with handles 16 being threaded on the bolts 14 and adapted to clamp the head plate 13 thereby to close the upper end of the receptacle 11. It will, of course, be understood that any other preferred means of securing the head plate 13 to the receptacle 11 may be used if desired. The head plate 13 may also be provided with ring handles 17, for convenience in removing the same when it is desired to fill the receptacle with the material.

Slidably mounted in the receptacle 11 is a follower plate 18, provided on its upper surface at the periphery thereof with a lipped packing ring 19, preferably made of leather or rubber. A plate 20, secured to the follower plate 18 by screws 21, serves to hold the packing ring 19 in its proper position.

The follower plate 18 has attached thereto the upper end of a piston rod 22, which extends through a stuffing box 23 in the lower end of the receptacle 11. The lower end of the piston rod 22 carries a piston 24 mounted in a cylinder 25.

Secured to the upper portion of the receptacle 11 is a bracket member 30, having a passageway 31 extending therethrough, the side wall of the receptacle 11 being complementally apertured as at 32, whereby the material may pass from the interior of the receptacle through the passageway 31, as will be hereinafter more fully set forth.

The outer end of the bracket member 30 is provided with a lip portion 33, which serves as a means for supporting a fixed spindle 34, held in place with respect thereto by means of a nut 35. The spindle 34 constitutes a means for journaling a rotatable mold member 36.

The mold member 36 is provided with a plurality of mold openings 37, in each of which is mounted a piston 38. Each of the pistons 38 is provided with a rod 39, which is suitably guided in a bracket 40 secured to a suitable portion of the mold member 36 in any preferred manner.

The rear end of each rod 39 is provided with a knob 41. The knobs 41 are adapted, when the mold member 30 is rotated, to encounter a sector cam 42, mounted by means of a sleeve portion 43 on the fixed spindle 34

(see Fig. 3). The sector cam 42 is adapted to impel the pistons 38 successively forward in their respective mold openings 37, as the knob portions 41 of rods 39 successively engage the sector cam 42.

The rearward movement of each piston 38 is limited by a collar 44, adjustably mounted on the rod 39. The purpose of the adjustment of the collar 44 on the rod 39 is to provide a convenient means for readily varying the size of the mold according to the requirements of the user.

The periphery of the mold member 36 is provided with sprocket teeth 50, whereby the mold member may be rotated by means of a chain 51, which in turn is driven by means of a sprocket 52 mounted on the shaft 53 of a speed reduction gear 54. The speed reduction gear 54 may be of any preferred type, such as may be readily procured in the open market, hence the interior construction and arrangement are not shown in the drawings.

The driving shaft 55 of the reduction gear 54 is provided with a pulley 56, over which passes a belt 57 which is driven by means of a pulley 58, mounted on the shaft 59 of an electric motor 60. The electric motor 60 is mounted on the framework 10 of the machine, and the reduction gear 54 is also mounted on an extending portion 61 of the framework 10.

The motor shaft 59 also carries a pulley 62, over which passes a belt 63 which drives the pulley 64 of an air compressor 65. A pipe line 66 extends from the air compressor to an air receiver tank 67. A valve 68 is mounted in the pipe line between the air compressor 65 and the receiver tank 67.

There is also provided a pipe line 69, extending from the receiver tank 67 and having branches 70 and 71 extending to the air cylinder 25 to points respectively above and below the piston 24 which is mounted in the air cylinder 25. Valves 72 and 73 are mounted in the respective pipe lines 70 and 71, whereby the air can be admitted above or below the piston 24 as required, and there are also provided outlet pipes 74 and 75 extending from the cylinder 25 above and below the piston 24 and provided with valves 76 and 77 respectively, for exhausting the air from above or below the piston 24 as required.

Arranged along the side of the mold member 36 is an inclined chute 80, adapted to receive the formed cakes as they are expelled from the molds and to permit the same to slide downward to another chute 81, whence they may be delivered to a suitable receptacle, not shown. The chutes 80 and 81 are omitted in Fig. 2 for the purpose of better illustrating the other portions of the machine.

The operation of the apparatus may now be explained. A supply of air under pressure is normally maintained in the air receiver tank 67 by means of the air compressor 65 which, as before stated, is driven by means of the motor 60. The valves 73 and 76 are closed, and the valves 72 and 77 are open. In this manner, the air under pressure is permitted to enter the air cylinder 25 above the piston 24, and the air contained within the cylinder 25 below the piston 24 may be exhausted therefrom. In this manner the follower plate is caused to descend to its lowermost position in the receptacle 11.

The head plate 13 of the receptacle 11 being removed, the interior of the receptacle above the upper plate 18 may now be filled with the material from which the articles are to be formed. For the making of codfish cakes, this will constitute a suitable mixture of codfish, mashed potatoes and such other ingredients as may be desired.

The head plate 13 now being replaced and the receptacle sealed by means of the hand nuts 15, the valves 72 and 77 are now closed and the valves 73 and 76 are opened, thereby admitting air under pressure below the piston 24 and exhausting the air from the cylinder 25 above said piston. The pressure of the air admitted below the piston 24 will, through the piston rod 22, cause the follower plate 18 to be pushed upward, forcing the mixture contained within the receptacle 11 through the passageway 31 of the bracket member 30.

The mold member 36 is caused to rotate by means of the driving chain 51 which, as hereinbefore pointed out, is driven by the sprocket 52 of the speed reduction gear 54, and the driving shaft 55 of the reduction gear is driven by the belt 57 extending from the motor 60. As each of the mold openings 37 of the mold member 36 is successively brought opposite the passageway 31 of the bracket member 30, the material from the receptacle 11 which passes through said passageway 31 will be forced into said mold openings 37.

The lip portion 33 at the end of the bracket 30 is of sufficient sidewise extension to prevent the material from being forced out of the sides of the mold openings as the same successively come into and go out of register with the passageway 31.

As the material is forced into each mold opening, the piston 38 therein will be pushed backward until the movement of the same is limited by the collar 44 impinging against the inner surface of the bracket 40. As the mold member 36 continues to rotate, the knobs 41, carried on the ends of the rods 39 with which the pistons 38 are provided, will successively encounter the sector cam 42, whereby the pistons 38 will be successively pushed forward in their respective mold openings, thereby ejecting the articles formed in the mold opening 37 as aforesaid.

It may here be noted that, as the piston 38 ejects the article formed in the mold opening as aforesaid, the piston 38 will remain with its front face flush with the face of the mold member 36, so that as the mold openings successively register with the passageway 31, the pistons 38 will be forced backward by the material which is fed through said passageway into the mold opening. In this manner, the trapping of air in the mold will be precluded, which otherwise would cause irregularities in the formation of the articles.

As the fish cake or other article being formed is ejected from the mold, the same will fall upon the chute 80, thence passing to the chute 81, and thence to a suitable basket or box (not shown) provided below the chute 81.

It will be noted that the sector cam may be readily adjusted circumferentially to insure the discharge of the formed cake at the proper point in the rotation of the mold member, and it will likewise be noted that the size of the cakes may be varied by adjusting the position of the collars 44 on their respective rods 39.

It will not, however, be necessary to change the adjustment of the sector cam when changes are made in the adjustment of the collars 44 on the rods 39, as the longitudinal location of the collar 43, by means of which the sector cam is supported on the fixed spindle 34, merely determines the location of the piston 38 at the end of the forward movement of the same to a point substantially flush with the front face of the mold member 36, whereas the amount of retraction of the piston 38 within the mold openings 37 determines the size of the cake to be formed in the mold member, and this is fixed by the position of the collars 44 on their respective rods 39.

After the material within the receptacle 11 is exhausted, the valves 73 and 76 are then closed and the valves 72 and 77 opened, after which the head plate 13 may be removed for the insertion of more material into the interior of the receptacle 11, as hereinbefore set forth.

It will be noted that by the foregoing arrangement there is provided apparatus for rapidly forming a plurality of uniformly shaped and sized fish cakes and the like, whereby the same may be economically produced with a minimum of manual operation.

Having thus described the nature and characteristic features of our invention, what we claim as new and desire to secure by Letters Patent, is:

1. In a machine of the character described a rotatable mold member having a plurality of mold openings, means for feeding material to said mold openings, each of said mold openings having a piston slidably mounted therein, each of said pistons having a rod extending rearwardly therefrom, brackets secured to the mold member in which said rods are guided, collars adjustably mounted on said rods and adapted to limit the rearward movement of the pistons, a fixed spindle on which the mold member is journaled, and a sector cam adapted to be engaged by the rear ends of said rods to force the pistons forward in the mold openings to discharge therefrom the articles formed therein, said sector cam being adjustable longitudinally and axially on said spindle.

2. In a machine of the character described, a rotatable mold member having a plurality of mold openings, means for feeding material to said mold openings, each of said mold openings having a piston slidably mounted therein, each of said pistons having a rod extending rearwardly therefrom, means for limiting the rearward movement of the pistons, a fixed spindle on which the mold member is journaled, and a sector cam adapted to be engaged by the rear ends of said rods to force the pistons forward in the mold openings to discharge therefrom the articles formed therein, said sector cam being adjustable longitudinally and axially on said spindle.

3. In a machine of the character described, a rotatable mold member having a plurality of mold openings, means for feeding material to said mold openings, each of said mold openings having a piston slidably mounted therein, each of said pistons having a rod extending rearwardly therefrom, means for limiting the rearward movement of the pistons, and a sector cam adapted to be engaged by the rear ends of said rods to force the pistons forward in the mold openings to discharge therefrom the articles formed therein, said sector cam being adjustable longitudinally and axially with respect to the mold member.

In testimony whereof, we have hereunto signed our names.

ISRAEL GOTTLIEB.
SAMUEL J. T. STOUT.